No. 615,656. Patented Dec. 6, 1898.
W. B. TURNER.
MACHINE FOR WORKING HIDES OR SKINS.
(Application filed May 28, 1897.)
(No Model.) 4 Sheets—Sheet 1.
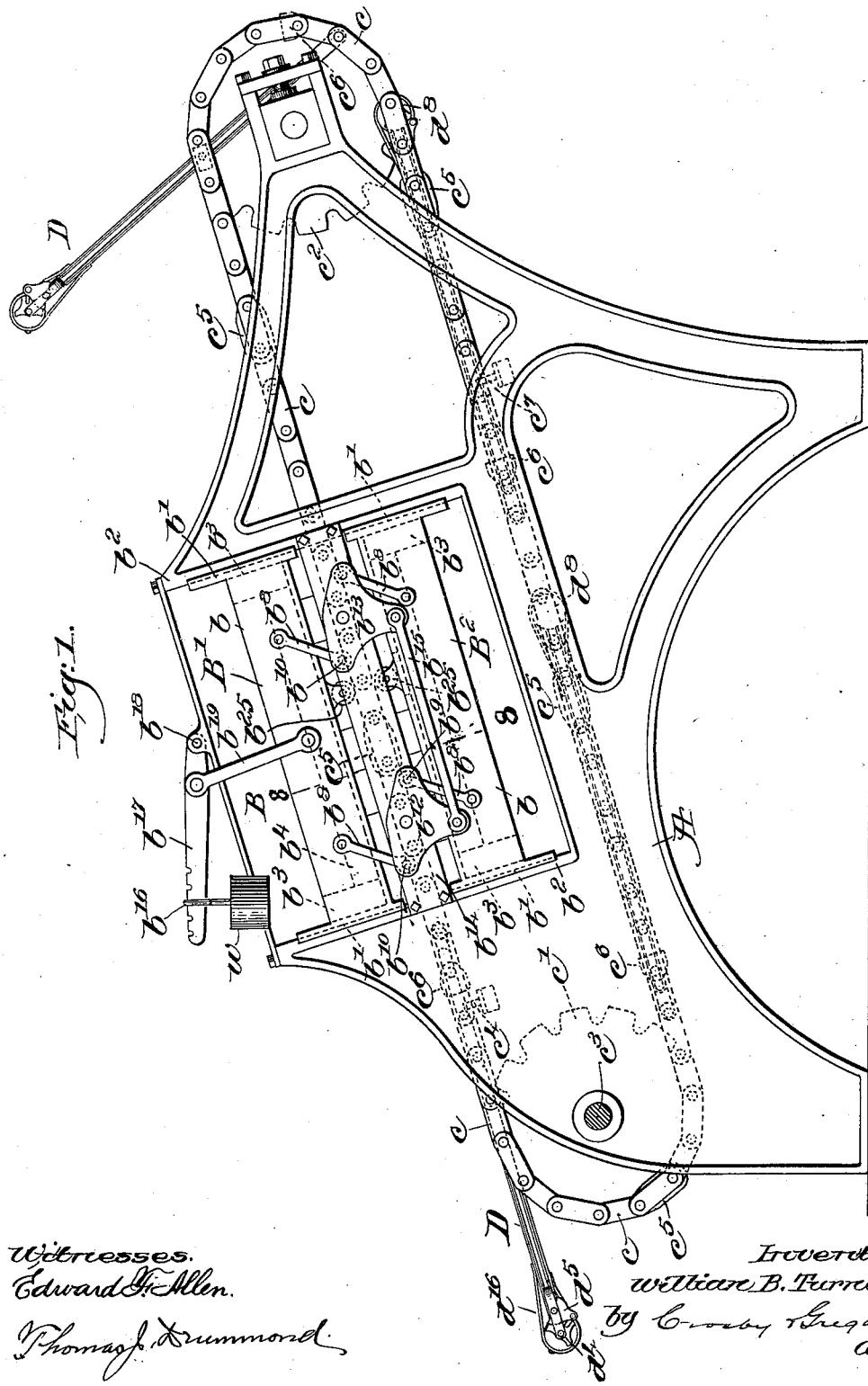
Witnesses.
Edward G. Allen.
Thomas J. Drummond.
Inventor:
William B. Turner.
by Crosby & Gregory
attys.

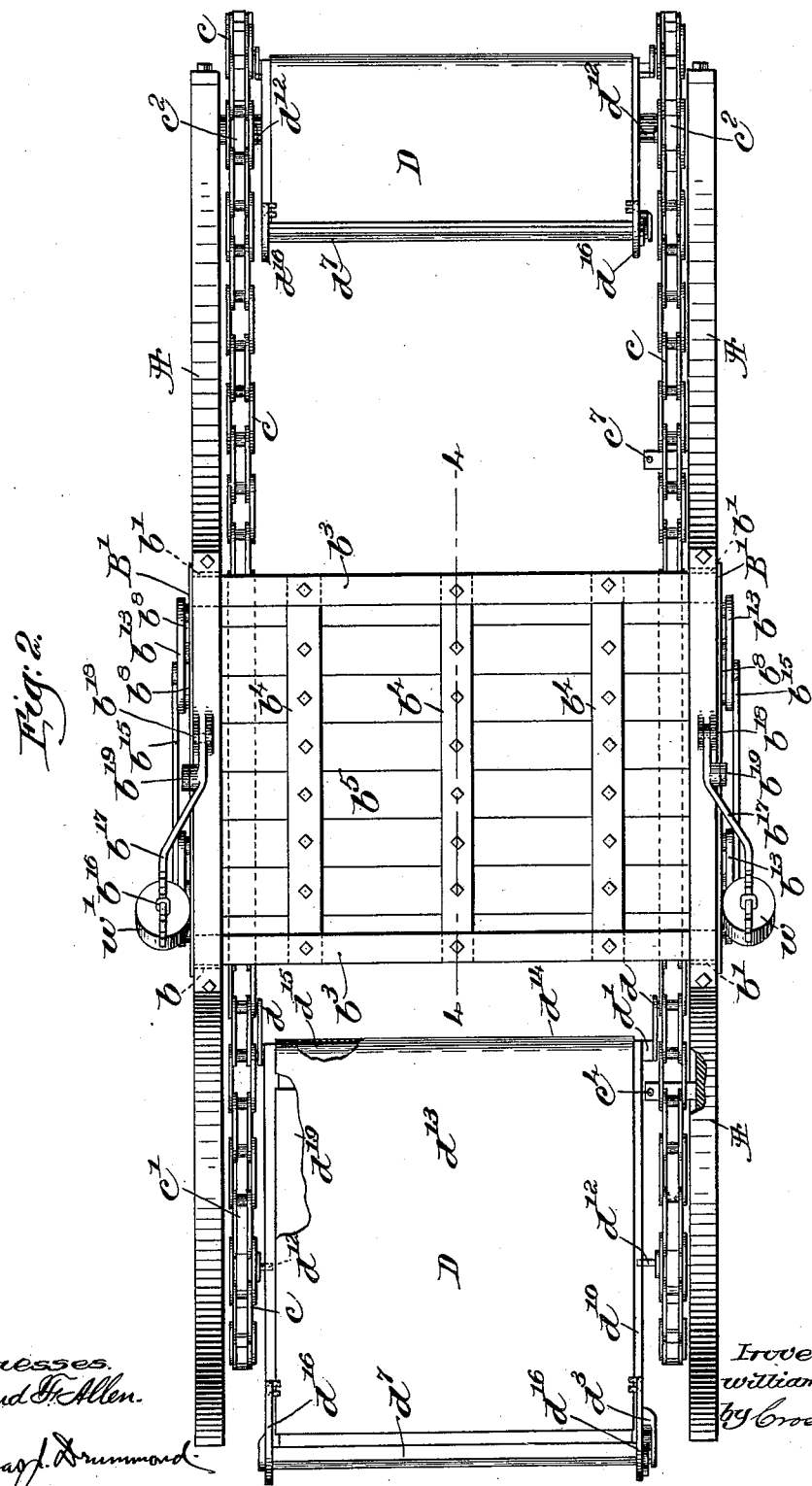

No. 615,656. Patented Dec. 6, 1898.
W. B. TURNER.
MACHINE FOR WORKING HIDES OR SKINS.
(Application filed May 28, 1897.)
(No Model.) 4 Sheets—Sheet 3.
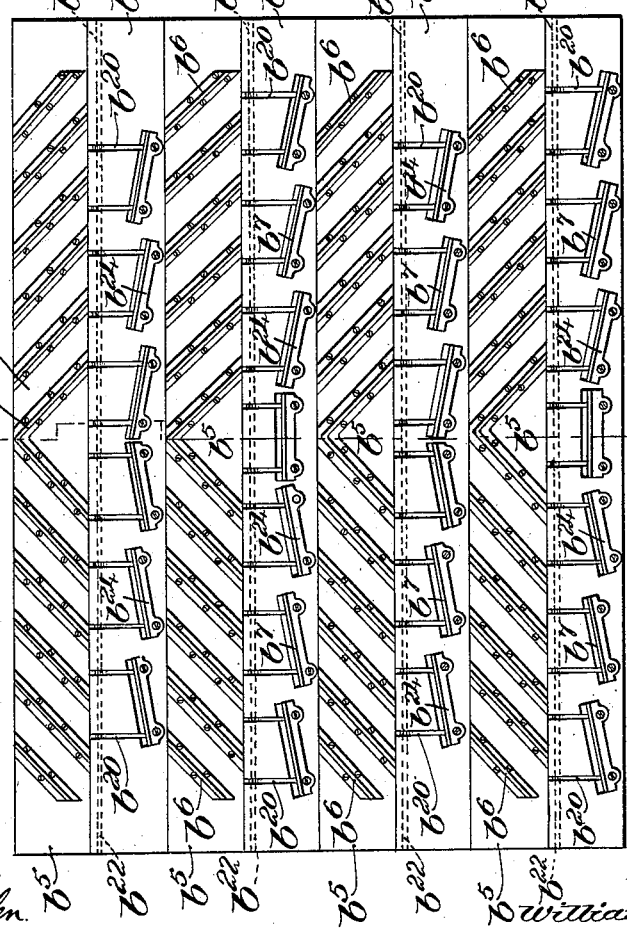

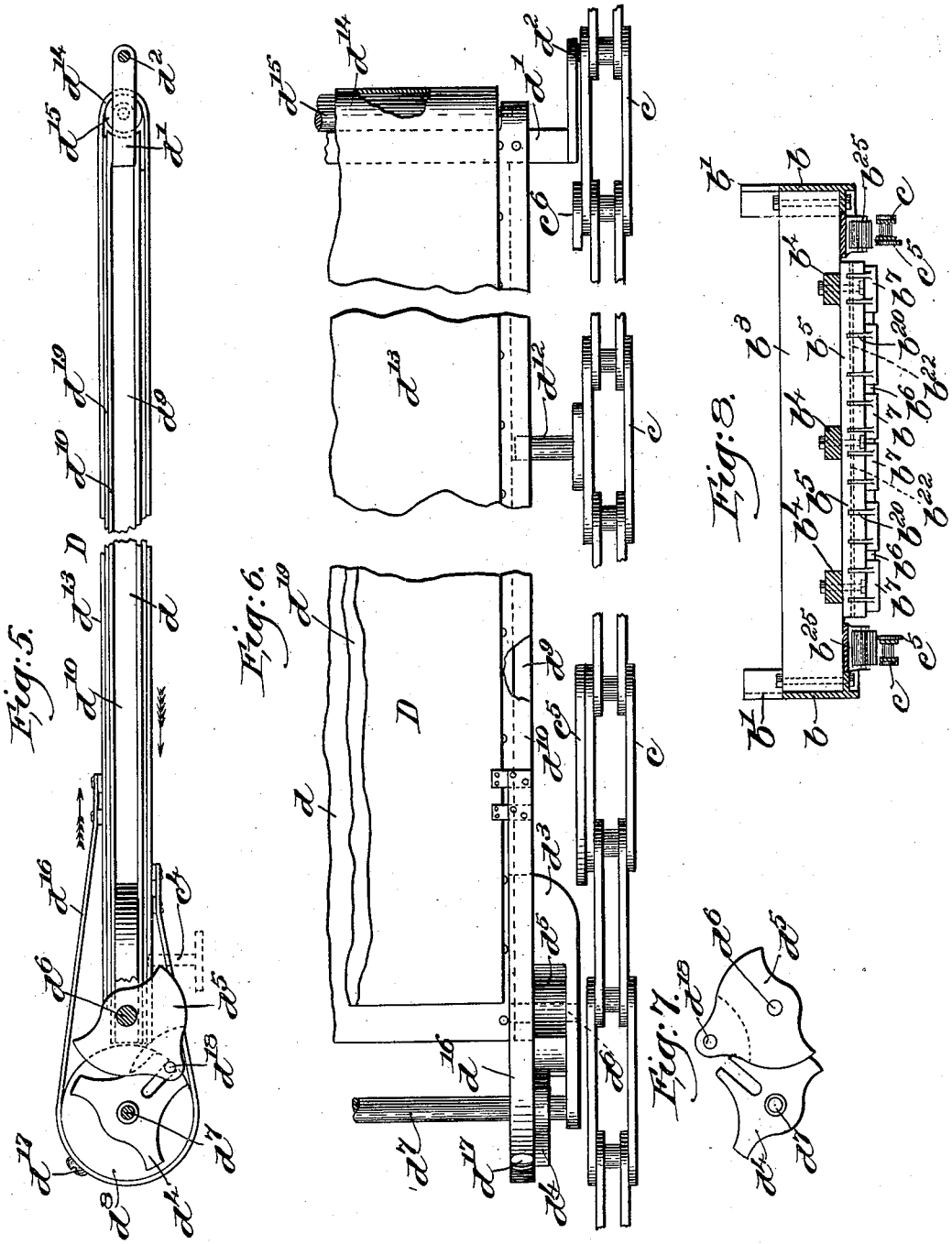

UNITED STATES PATENT OFFICE.

WILLIAM B. TURNER, OF SOMERVILLE, MASSACHUSETTS, ASSIGNOR TO THE TANNERS' AND CURRIERS' MACHINERY COMPANY, OF BOSTON, MASSACHUSETTS.

MACHINE FOR WORKING HIDES OR SKINS.

SPECIFICATION forming part of Letters Patent No. 615,656, dated December 6, 1898.

Application filed May 28, 1897. Serial No. 638,551. (No model.)

*To all whom it may concern:*

Be it known that I, WILLIAM B. TURNER, of Somerville, county of Middlesex, State of Massachusetts, have invented an Improvement in Machines for Working Hides or Leather, of which the following description, in connection with the accompanying drawings, is a specification, like letters on the drawings representing like parts.

My present invention relates to further improvements of the novel type of machine for dressing hides, skins, &c., which I have further disclosed in connection with other features thereof in my Patent No. 584,123, dated June 8, 1897. Machines of this general type— i. e., machines arranged to work a considerable area of hide at once—have heretofore been constructed with cylinders or movable working surfaces which were rigid, moving in one fixed unvarying plane, the result being that hides and skins when worked thereby have been worked under the supposition that they were of unvarying thickness throughout; but inasmuch as hides have more or less thin portions these said thin portions have been improperly worked or not worked at all by these machines.

Accordingly it is the main object of my invention to provide a machine which will work hides and skins uniformly throughout the hide, so that any thin portions thereof will be worked as thoroughly and satisfactorily as the rest of the hide.

It is new with me, as shown in my invention as embodied in the mechanism herein shown and in the mechanism shown in my before-mentioned patent, to provide means for operating on the hides simultaneously on opposite sides of the "work-table," (and by that term, as herein used, I mean anything that holds the hides,) said means comprising working devices or blades arranged in substantially flat planes parallel to each other.

In my before-mentioned patent I have shown the blades in an endless series moving around to coöperate with each other in said parallel planes when they are brought into working engagement with the material being worked, whereas in the present embodiment of my invention I have shown the blades as stationary—that is, the blades remain relatively stationary to the table as the latter carries the hide beneath and preferably between the working edges of the blades.

My invention also comprises various further details, by reason of which the working members are automatically adjusted to permit the necessary movements of the hide on its table and to permit a relatively rapid passage of the hides thereto.

My invention also includes an improved working member or improved arrangement of blades to constitute the working surface for the machine, this surface being capable of use either in the stationary form mentioned or in a movable arrangement—such, for instance, as shown in my above-mentioned patent.

Further features of my invention and the details of construction thereof will appear more fully in the course of the following description, taken in connection with the accompanying drawings illustrative of a preferred embodiment of my invention, and the latter will be more particularly defined in the appended claims, also forming a part of this specification.

In the drawings, Figure 1 represents in side elevation a preferred embodiment of my invention. Fig. 2 is a top plan view thereof, parts being broken away to show the details of construction. Fig. 3 is an enlarged plan view of the working surface, showing one arrangement of the blades. Fig. 4 is a central vertical section of the working member, taken on the lines 4 4, Figs. 2 and 3. Fig. 4$^a$ is an enlarged sectional detail of the yielding working blade. Fig. 5 is an enlarged view, in broken detail, showing in side elevation the table for carrying the hides or skins, together with the means for shifting the latter thereon. Fig. 6 is a broken detail in plan of the parts shown in Fig. 5. Fig. 7 is a fragmentary view, in side elevation, showing the shifting and locking gear in the opposite position from that shown in Fig. 5; and Fig. 8 is a detail sectional view on the line 8 8, Fig. 1.

The frame A may be of any convenient or usual form, being herein shown as elongated horizontally in order to accommodate the working parts of the machine within the space of one ordinary story of a building.

The operating or working parts of my machine comprise, in general terms, two portions—viz., a working member B or set of members, as the case may be, and a carrier for carrying the hides or skins to be operated upon by the working member, the carrier being herein shown as consisting of an endless chain $c$, passing about sprocket-wheels $c'$ $c^2$ at either end of the machine and receiving motion from a power-shaft $c^3$, although I do not intend to restrict my invention in these respects.

I have herein shown the working member B as comprising opposite frames $B'$ $B^2$, (shown in enlarged sectional detail in Fig. 4,) each consisting of end plates or castings $b$, (see Fig. 1,) having end flanges $b'$ to embrace and slide on the parallel uprights or guideways $b^2$ provided therefor in the main frame of the machine, these end plates or castings $b$ being secured to cross beams or braces $b^3$, joined together by girders $b^4$, and across the latter are secured the timbers $b^5$, on which are secured the blades $b^6$ $b^7$.

I have herein shown various of the portions of the frames of the working member as composed of wood, although it will be understood that any other suitable material may be used in their construction.

The two frames $B'$ $B^2$ are herein shown as connected together at each end by means of links $b^8$, arranged oppositely in pairs and pivoted, respectively, at $b^9$ $b^{10}$ to the opposite ends of double bell-cranks $b^{12}$ $b^{13}$, centrally pivoted to a cross-plate $b^{14}$ on the side of the main frame of the machine, and in order that the front and rear sides of the frames $B'$ $B^2$ may rise and fall together the two bell-cranks at each end thereof are connected together by a rod $b^{15}$.

The two parts $B'$ $B^2$ of the working member are held normally toward each other, so as to be in proper relation to engage and work the hide or other material to be operated upon, counterweights $w$ $w'$ being herein shown for that purpose adjustably mounted at $b^{16}$ on the outer ends of the levers $b^{17}$, pivoted at $b^{18}$ on cross-bars at each side of the machine and connected to the upper part $B'$ of the working member by links $b^{19}$.

From the above description it will be evident that the weights $w$ $w'$ constantly tend to hold the frames $B'$ $B^2$ toward each other, while at the same time they permit them to yield away from each other whenever necessary, and also permit one end thereof to yield relatively to the other end to accommodate unevenness of material being carried between them.

Referring now to Figs. 3 and 4, where the arrangement and construction of my improved working surfaces are shown, it will be seen that in the preferred embodiment thereof, as herein shown, the latter consist of an alternate arrangement of fixed and unyielding blades $b^6$ and yielding blades $b^7$, the former being herein shown as sections of T-irons firmly and immovably secured on the outer faces of the timbers $b^5$ in reverse diagonal and parallel arrangement, slanting in opposite directions from the middle portion of each timber, the successive courses or series thereof on the successive timbers being preferably arranged in staggered order relatively to the next preceding and following series, so that there will be no part of the skin that will not be operated upon thereby. The yielding blades $b^7$ are herein shown as carried by arms $b^{20}$, extending forwardly therefrom, it being understood that the hides are carried past the working members in the direction of the arrow, Fig. 3, these arms being let into recesses $b^{21}$ provided therefor (see Figs. 4 and 4$^a$) and pivotally mounted on transverse rods $b^{22}$, (shown in dotted lines in Fig. 3 and in section in Fig. 4,) the rear or swinging knife-edge of the blade being normally held forward in working position by suitable means, springs $s$ being herein shown for that purpose, engaging rearwardly-projecting flanges $b^{23}$, which overlie the springs, these flanges serving as stops to engage blades $b^{24}$, secured to the timber to prevent the yielding blades $b^7$ from being entirely projected by their springs.

I prefer to arrange the yielding blades at a different angle from that occupied by the fixed blades $b^6$ and also prefer that the yielding blades should be staggered relatively to the fixed blades and relatively to each other in the succeeding series thereof, as shown, and I also prefer to arrange the respective blades in alternate order, the yielding blades succeeding the fixed blades alternately, as herein shown, although in each and all of these respects I wish it understood that I am at liberty to arrange the blades at any angle relatively to each other or straight across, if desired, and that I am at liberty to use either the fixed or yielding blades alone whenever advantageous to particular kinds of work or desired for other reasons, and, furthermore, I wish it understood that I may employ the yielding blades in connection with the machine of my said other patent or any other machine to which they may be adapted. I regard this feature of providing yielding blades as of prime importance in my invention, inasmuch as it enables me effectually to work uneven hides and skins, the yielding blades maintaining an even working engagement with the material brought beneath them, irrespective of the thickness of said material. So far as I am aware I am the first to make provision for this purpose, and I therefore consider myself entitled to claim, broadly, the provision of yielding working members, tools, or other devices to engage the hide and operate on thick and thin portions thereof alike, conforming themselves by their yielding action to work thin portions with the same effectiveness as thicker portions.

I am aware that various devices have been proposed for scouring hides in which one stone or tool at a time has been arranged to dig into the hide in narrow paths back and forth; but my invention has nothing whatever to do with such an operation or mechanism, inasmuch as my object is not to scour the hide or leather, but to "put out" skins by working the entire hide at once, and to that end I have provided a working surface having a considerable area, so as to work a large extent of the hide at once, and provided with a plurality of working blades arranged to simultaneously engage the hide, certain of said blades being yielding irrespective of the shape or extent of the other fixed blades.

Referring to Figs. 5, 6, and 7 in connection with Figs. 1 and 2, it will be seen that the carrier-chains $c$ are provided at intervals with supporting members, tables, or holders D, on which the hides are thrown to be carried thereby between the working blades. Each of these tables comprises a main frame or support $d$, herein shown as a board extending from one side thereof to the other and having at its forward end a bar $d'$, pivotally secured at $d^2$ to the chain at each end of the bar and at its rear end on brackets $d^3$, carrying an intermittent gear $d^4$ and an operating trip or dog $d^5$, the latter being journaled on a rod $d^6$, extending from the bracket $d^3$ to the frame $d$, as shown in dotted lines in Fig. 6, and the former being journaled on a rod $d^7$, extended across the table and having a pulley $d^8$ at each end thereof for a purpose to be presently described. The table $d$ has a channel $d^9$ at each edge thereof, this channel being herein shown as formed by the projecting flanges or edges of a sheet-iron covering $d^{10}$, although any other means may be provided, if desired. This channel coöperates with a pin $d^{12}$ on the chain $c$ to guide the table in proper position in its travel, the guide and pin coöperating to maintain the table level as it is passing between the working blades and to prevent its dropping down, the operation thereof being similar to that which I have described in my before-mentioned patent. On the table I have provided an apron $d^{13}$, having at $d^{14}$ a portion free to bend to permit the apron to be shifted sufficiently to bring into contact with the working blades that portion of the skin or hide carried thereon which would otherwise not be worked. The apron for this purpose passing over a roll $d^{15}$ at the forward end of the table and being actuated by means of a strap or straps $d^{16}$, secured to the apron on the upper and lower sides of the table (see Fig. 5) at each edge thereof and fastened at $d^{17}$ to the pulleys $d^8$, so that when the depending edge of the dog $d^5$ comes into engagement with a stop $c^4$ (shown in dotted lines in Figs. 1 and 5) the dog will rotate the pulleys $d^8$ by means of the slot-and-pin engagement $d^{18}$ (see Fig. 5) between the said dog and the gear $d^4$, and will thereby shift the apron $d^{14}$ from the position shown in Fig. 5 to the position shown at the extreme right, Fig. 1, Fig. 5 showing the apron partly shifted. The dog $d^5$ projects at its inner face in alinement with the gear $d^4$, as will be evident by viewing Fig. 6, and the dog and gear are formed to nest into each other, as is clearly shown in Figs. 5 and 7, so that when the table is shifted to either of its extreme positions it is firmly locked in its said position by the engagement of the dog with a concaved portion of the gear on a dead-center.

In practice I have found that the pressure of the working tools or blades extending as they do in flat planes causes the apron to become so firmly pressed against the board or frame $d$ as to require undue power in order to shift it thereon. Accordingly in order to reduce this frictional resistance I have herein provided a metallic backing $d^{19}$ for the canvas or other apron $d^{14}$, this backing being secured to the apron and preventing the latter from unduly clinging to the frame of the table.

It will be understood that the hides are thrown over the table as the latter comes up at the left-hand end of the machine, Fig. 1, and are carried by the table forward between the parts of the working member, and in order that the carrier may operate with freedom and relative rapidity I have herein shown the frames B' B² as provided with opposite projections adjacent their working surfaces, each preferably provided with a friction-wheel $b^{25}$, which wheels or rolls are engaged by a slightly wedge-shaped enlargement $c^5$, (shown in dotted lines in Fig. 1 and in full lines in Fig. 6,) which acts to slightly separate the working surfaces just as the forward edge of the work-table is ready to enter between them, the wedge $c^5$ leaving the friction-wheels $b^{25}$, however, before the table has entered to any extent, and thereby permitting the working surfaces to be pressed together by their weights $w$ $w'$, so as properly to work the hide or other material carried by the table. As the table progresses wedge-pieces $c^6$ engage the friction wheels or rolls $b^{25}$, removing the working surfaces from contact with the hide for an instant, while the dog $d^5$ is engaged by the stop $c^4$, as before explained, and the hide is shifted.

I do not intend to limit myself to the form of stop and dog herein shown, inasmuch as I regard the arrangement of coöperating wedges and projections, one on the fixed part and the other on the moving part, as new for separating the working surfaces, so as to remove them from the hide in order to permit the latter to be shifted by means of any suitable shifting mechanism—such, for example, as shown in my before-mentioned patent—or any kind of a dog-and-stop arrangement.

After the hide has been carried past the working surfaces it is necessary that the apron should be shifted back to its original position in order that the operation already described may be repeated for another hide, and for this purpose I have provided a second stop $c^7$ in the path of the returning table, this stop acting in the same manner as the stop $c^4$, but engaging the dog $d^5$ from the opposite side, and thereby shifting the apron in the opposite direction from its previous movement.

The operation of my machine as above described is as follows, viz: As a table D is brought around to sprocket-wheels $c'$ an operator throws a hide over the table so that a portion of the hide will rest on top of the table and a portion thereof will hang beneath the same. The table proceeds, and as it is about to enter between the opposite frames $B' B^2$ the wedge $c^5$ enters between the friction-rolls $b^{25}$, thereby separating the working surfaces, so as to permit the table and the hide carried thereon to enter between the surfaces without the latter striking the front edge of the table and hide. The hide is partially worked as it proceeds between the working surfaces until the wedges $c^6$ come into engagement with the friction-rolls $b^{25}$, and the stop $c^4$ simultaneously therewith engages the dog $d^5$, which several engagements cause the working surfaces to separate slightly and the hide to be shifted between the same, so that that portion of the hide which was previously around the forward edge of the table has by this movement been shifted on top of the table, and a portion of the hide which was previously below the table and which had already been sufficiently worked by the lower working blades has taken the place of the previously-unworked portion of the hide at the front edge of the table. The working surfaces are then brought forcibly into engagement again with the hide by the passage of the wedges $c^6$ beyond the rolls $b^{25}$, and the working of the hide is then completed by the further forward movement of the table. As shown, the wedges $c^6$ are near the front end of the table, and the rolls $b^{25}$ are located to come in contact therewith when the hide is about half-way through the working surfaces, so that after the hide has been shifted it still has to pass through the remainder of the working surfaces and then be acted on. Fig. 7 shows the position the parts $d^4 d^5$ are left in when the stop $c^4$ (dotted in Fig. 5) catches the front lower corner of dog $d^5$, Fig. 5, and the chain then drags said dog $d^5$ ahead, turning it to said position in dragging it over the stop $c^4$. The drawing is believed to be correct, having been made from the machine itself. The apron, excepting over the end at $d^{14}$, has a sheet of zinc secured as a part of it; but at $d^{14}$ the apron is free to bend. This zinc backing is not shown in the drawings to extend to the portion $d^{14}$. (See Fig. 5.) The roll $d^{15}$ may be fast or loose, preferably loose, so as to roll. The hides are held on the table by gravity, the operation being as when a blanket is "thrown over" a chair, for instance. The hide having arrived at the upper or right-hand end of the machine, Fig. 1, is removed by an attendant and the table proceeds in its travel until its dog $d^5$ is engaged by the stop $c^7$, when the apron is thereby shifted back again to its original position to again receive another hide or skin. As the hide proceeds between the working surfaces the blades thereof operate alike upon the thick and thin places thereof, for the reason that certain (or, if desired, all) of the blades are made independently yielding, so that when a thin place is brought beneath the working surface the blade at that point follows the thin surface and presses with a uniform pressure against the same.

If the alternate arrangement of rigid and yielding blades in successive rows is employed, such as shown in Figs. 3 and 4, it will be evident that the working edges of the blades $b^6$ will determine the general plane of the working surface, these rigid blades being held apart according to the thicker portions of the hide. If the hide had absolutely uniform thickness, the working edges of the blades $b^7$ would lie in precisely the same plane with the edges of the blades $b^6$; but inasmuch as hides invariably have relatively thick and thin places the blades $b^7$ will be projected forward by their springs whenever a thin spot comes opposite to them, being constructed to project normally beyond the plane of the edges of blades $b^6$, and will yield back into the said general plane when the thicker portions of the hide reach them. In other words, these "yielding blades" (and by that term I mean any working tool) follow every unevenness of the hide with a uniform pressure, so as to insure that no matter how irregular and uneven a hide may be every portion thereof will receive proper attention and be duly worked. I regard this feature of my invention as a very valuable one, inasmuch as it enables me to produce far superior results and to do so rapidly.

I have herein shown the working surfaces as stationary and have chosen to depend for the relative movement of the tables and blades on the movement of the former alone, although I wish it understood that the working surfaces, either as shown alternately rigid and yielding, or all yielding, if desired, and either in staggered order and at any angle or not, may be made to move either as shown in my before-mentioned patent or in any other way, if desired, and while I have herein shown and claimed certain specific details of improvement certain other features are generic to my two applications and are so claimed hereinafter.

Various changes in form, combination, and arrangement of parts may be resorted to within the spirit and scope of my invention, and I wish it understood that I am not limited in respect thereto otherwise than as hereinafter set forth in the claims.

Having described my invention, what I claim as new, and desire to secure by Letters Patent, is—

1. In a machine of the class described, having a work-table, the combination therewith of a working member having a number of independent working blades extending in a plurality of series transverse to said work-table, the blades of alternate series being independently yielding, and the blades of the other series being fixed, substantially as described.

2. In a machine of the class described, a plurality of working blades arranged to simultaneously engage a hide, said blades extending in a substantially flat plane and having a considerable area to work a large extent of hide at once, a work-table to carry the material being worked by said blades, and means to impart a relative traveling movement to said table and blades, certain of said blades being independently yielding relatively to the other blades, and means to hold them yieldingly against the work, whereby they will operate alike upon thin and thick places thereof, substantially as described.

3. In a machine of the class described, having a work-table, the combination therewith of a working member having a number of independent and relatively short working blades extending in a series entirely across said table, said blades being independently yielding relatively to said table and to each other, substantially as described.

4. In a machine of the class described, having a work-table, the combination therewith of a working member having a large number of relatively short working blades throughout its extent, said member having a considerable area to work a large extent of hide at once, certain of said blades here and there throughout the extent of the working member being yielding, and others thereof being rigid, substantially as described.

5. In a machine of the class described, having a work-table, the combination therewith of a working member having a number of independently-yielding working blades, each having a stop, holding-blades on the working member overhanging said stops, and springs normally maintaining said working blades projected with their stops against said holding-blades, substantially as described.

6. In a machine of the class described, having a work-table, the combination therewith of a working member having a number of independently-yielding working blades, each having a stop, holding-blades on the working member overhanging said stops, and springs normally maintaining said working blades projected with their stops against said holding-blades, said member also having a number of fixed working blades, said yielding blades normally projecting slightly beyond the plane of said fixed blades, substantially as described.

7. The combination with an endless carrier, provided with one or more work-tables, of two sets of working blades arranged in opposite parallel planes to operate on opposite sides of the work-table, certain of said blades being yielding relatively to others adjacent thereto and to the table, substantially as described.

8. The combination with a work-table and means to move it, of two opposite flat working surfaces arranged to operate on opposite sides of said table, transverse ways therefor, means at each end of said working surfaces and adjacent each side thereof to cause said respective ends to remain parallel to each other in their movements on said ways, and means operating at the middle of each end of one of said surfaces, tending to move said surfaces toward each other, substantially as described.

9. The combination with a work-table and means to move it, of two opposite flat working surfaces arranged to operate on opposite sides of said table, transverse ways therefor, independent means whereby the respective ends of said working surfaces may separate slightly independently of each other, and means operating at the middle of each end of one of said surfaces, tending to move said surfaces toward each other, substantially as described.

10. In a machine of the class described, a frame adapted to support a working surface, said frame being provided with a projection adjacent its working face, combined with an endless carrier and with the tables carried thereby, said carrier having wedges at suitable intervals to engage said projection and remove said frame to permit the adjacent table to enter beneath the same, substantially as described.

11. In a machine of the class described, a frame adapted to support a working surface, said frame being provided with a projection adjacent its working face, combined with an endless carrier and with the tables carried thereby, said carrier having wedges at suitable intervals to engage said projection and remove said frame to permit the adjacent table to enter beneath the same, said table having a shifting apron and means to shift the same, including a dog, a stop to engage said dog, and a second wedge adjacent the table to again remove said frame, said second wedge engaging said projection simultaneously with the engagement of said stop with said dog whereby the apron is shifted beneath said frame when the latter is removed therefrom, substantially as described.

12. In a machine of the class described, a table comprising a frame, a flexible apron thereon, means to shift said apron and means to lock said apron in its shifted positions, substantially as described.

13. In a machine of the class described, a table, a carrier therefor, said table having a shifting apron thereon, and means to shift it, said means including a dog and an intermittent gear nesting into each other and having a slot-and-pin connection, and a stop stationary relatively to said dog and arranged to engage said dog to shift said apron, substantially as described.

14. In a machine of the class described, a table, comprising a frame and an apron, and means to shift the apron on the table, said apron having a backing of sheet metal secured thereto between the apron and the table to prevent the clinging of the apron to the table, substantially as described.

15. In a machine of the class described, a frame adapted to support a working surface, said frame being provided with a projection adjacent its working face, combined with an endless carrier and with the tables carried thereby, said carrier having wedges at suitable intervals to engage said projection and remove said frame to permit the adjacent table to enter beneath the same, said table having a shifting apron and means to shift the same, and a second wedge adjacent the table to again remove said frame, said second wedge engaging said projection simultaneously with the shifting of said apron, substantially as described.

16. In a machine of the class described, a table comprising a frame and an apron, and means to shift the apron on the table, and means interposed between said apron and said table against which the apron rests throughout its hide-receiving area, to prevent the clinging of the apron to the table when it is shifted and thereby enable it to be shifted with minimum power, substantially as described.

17. In a machine of the class described, a frame adapted to support a working surface, said frame being provided with a projection adjacent its working face, combined with an endless carrier and with the tables carried thereby, means for shifting the hides on said tables, and wedges carried by said carrier at suitable intervals to engage said projection and remove said frame to permit the hides to be shifted, substantially as described.

18. In a machine of the class described, a working surface movable to and from the work, an endless carrier, work-tables and their aprons carried thereby, means, including a wedge, for moving said working surface away from a work-table, and means operating when said working surface is removed for shifting the apron on said table, said shifting means including a stop and a device engaging it, one being moved by the other, substantially as described.

19. In a machine of the class described, a working member movable to and from the work, an endless carrier, work-tables carried thereby, aprons shiftable on said tables, a wedge for moving said working member out of working position to permit an apron to be shifted, means to shift the apron beneath said member while the latter is removed, and means for simultaneously shifting in a reverse direction an opposite apron which had been previously shifted, substantially as described.

In testimony whereof I have signed my name to this specification in the presence of two subscribing witnesses.

WILLIAM B. TURNER.

Witnesses:
GEO. H. MAXWELL,
ALEX. C. PROUDFIT.